United States Patent [19]

Adams

[11] Patent Number: 4,485,937
[45] Date of Patent: Dec. 4, 1984

[54] CAN DISPENSING APPARATUS
[76] Inventor: Morgan A. Adams, 1501 N. 35th Ave., Phoenix, Ariz. 85009
[21] Appl. No.: 370,940
[22] Filed: Apr. 22, 1982
[51] Int. Cl.³ .......................................... B65G 59/06
[52] U.S. Cl. .................. 221/129; 221/131; 221/150 R; 221/193; 221/251; 221/268
[58] Field of Search .......... 221/124, 129, 131, 150 R, 221/150 HC, 193-196, 251, 301, 263, 266, 268, 281, 273, 274

[56] References Cited

U.S. PATENT DOCUMENTS

| | | |
|---|---|---|
| 309,103 | 12/1884 | Schofield . |
| 493,087 | 3/1893 | Hayden . |
| 1,008,429 | 11/1911 | Osmer .................................. 221/301 |
| 1,113,476 | 10/1914 | Osmer .................................. 221/131 |
| 1,351,589 | 8/1920 | Vons .................................. 221/251 X |
| 1,446,381 | 2/1923 | Dent .................................. 221/274 X |
| 1,773,885 | 8/1930 | Staley . |
| 2,956,660 | 10/1960 | Nordquist ............................. 194/2 |
| 3,090,521 | 5/1963 | Fazekas ................................ 221/6 |
| 3,094,242 | 6/1963 | Kay et al. ......................... 221/274 X |
| 3,144,113 | 8/1964 | Peterson .............................. 194/37 |
| 3,999,684 | 12/1976 | Ekholm ................................ 221/301 |

FOREIGN PATENT DOCUMENTS 250090 11/1962 Australia ...................... 221/150 HC Primary Examiner—Charles A. Marmor
Attorney, Agent, or Firm—Cahill, Sutton & Thomas

[57] ABSTRACT

A can dispenser includes a storage rack having a lowermost storage shelf extending downwardly at a slight angle to the horizontal toward a discharge end thereof. A pair of stops are secured to the discharge end along opposing sides thereof for preventing the stored cans from freely rolling out of the discharge end. A dispensing lever includes first and second ends and is supported for limited turning movement about a lateral axis to raise the second end of the dispensing lever when the first end thereof is forced downward. The second end of the dispensing lever includes a camming surface disposed between and extending generally behind the stops for raising a can to be dispensed off of the lowermost storage shelf and above the stops, while a catch surface disposed behind and below the camming surface temporarily prevents further advancement of the remaining cans in the storage rack. A linkage which secures the dispensing lever to the discharge end of the storage rack includes a runway for receiving a can rolled off of the camming surface. The dispensing lever includes a downwardly inclined ramp for receiving cans rolled down the runway and for delivering the received cans to the first end thereof. The dispensing lever extends through an aperture within a wall of a thermally insulated enclosure for dispensing cans maintained at a desired temperature inside the enclosure.

11 Claims, 11 Drawing Figures

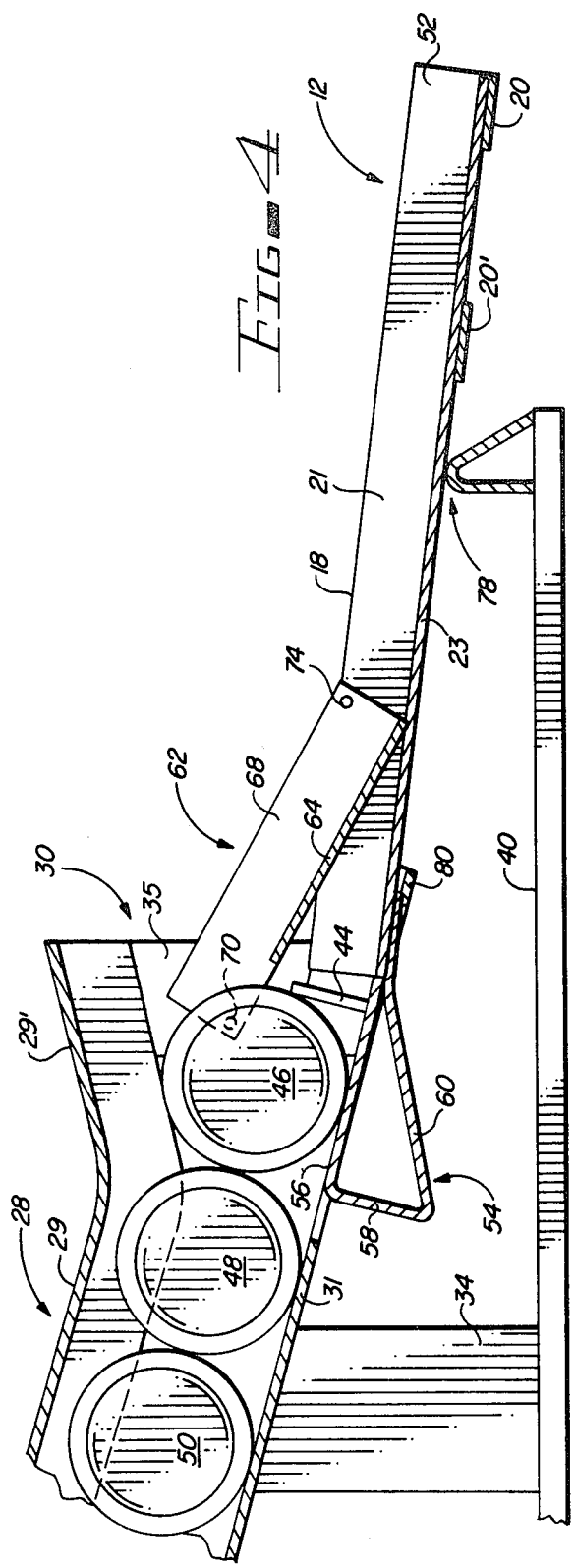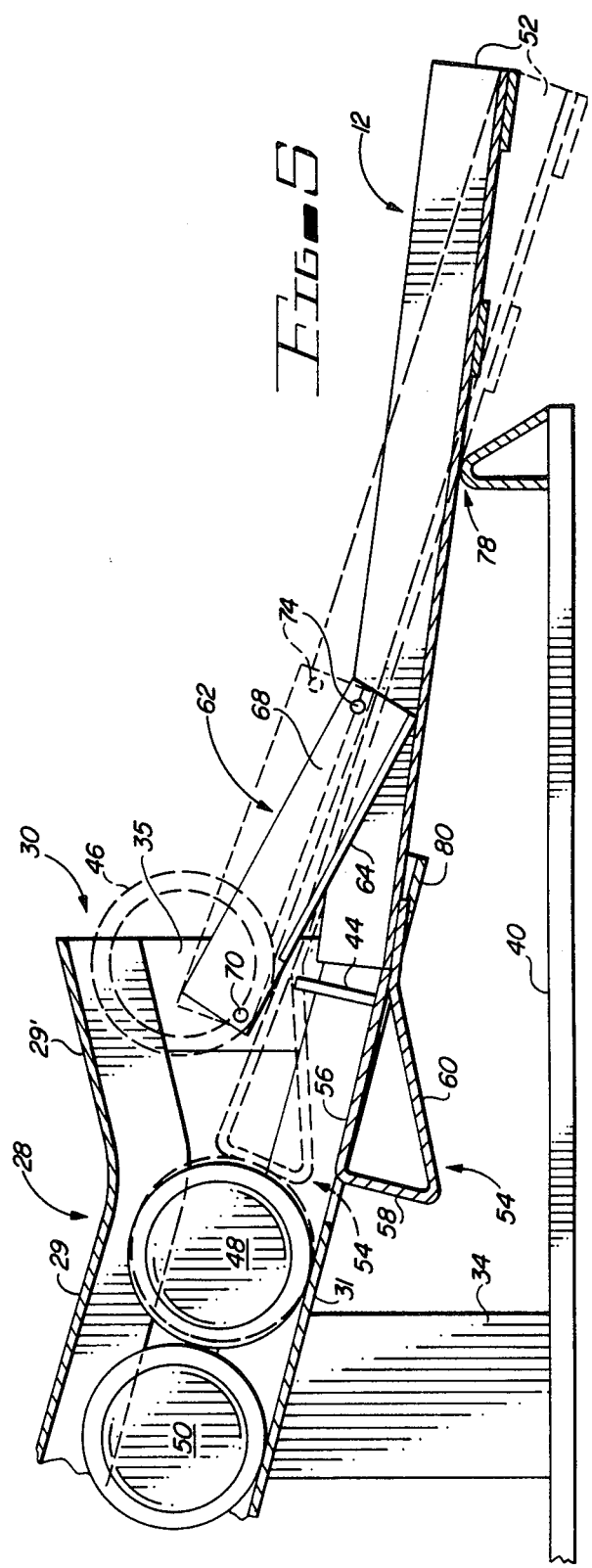

CAN DISPENSING APPARATUS

BACKGROUND OF THE INVENTION

1. Field of the Invention

The present invention relates generally to a mechanism for individually dispensing cylindrically shaped cans from a storage area provided for a plurality of such cans, and more particularly, to a can dispenser which quickly and conveniently dispenses such cans into the hand of a user without substantial agitation of the contents of the can.

2. Description of the Prior Art

Many nightclubs, dance halls, restaurants and taverns are equipped with one or more beer serving stations at which a variety of canned beer products are maintained. Typically, such canned beer products are stocked in refrigerated cabinets or chests behind the bar or serving area. When the bartender receives an order for a particular canned beer product, he must open the door to the cabinet or chest, pull out the desired product, and then close the door.

During non-peak business hours, the aforesaid procedure does not pose a particular inconvenience or problem to a bartender; however, during peak business hours, bartenders often have difficulty filling orders at the rate at which such orders are received.

At such times, the necessity to open the door to the cabinet or chest, find the desired canned beer product, and subsequently close the door unduly limits the ability of the bartender to quickly fill orders for beer. Furthermore, such storage cabinets or chests have limited capacities and typically must be frequently restocked from a large capacity refrigerated enclosure, such as a walk-in cooler, during peak business hours when the bartender can ill afford to leave the bar. Such drinking establishments may depend to a large extent upon beer sales to generate revenues, and substantial delays in filling orders for canned beer products can severely curtail income during such peak business hours.

Dispensing mechanisms adapted to dispense canned products, as from a vending machine, are well known in the art. For example, various types of canned dispenser mechanisms are disclosed in U.S. Pat. Nos. 1,773,885, 2,956,660, 3,090,521 and 3,144,113. However, each of the prior art dispensing mechanisms known to the present inventor are believed to be subject to certain deficiencies which would restrict useage thereof for quickly and conveniently dispensing canned beer products to a bartender. For example, some of such dispensing mechanisms are designed to dispense cans from a generally vertical storage rack, yet such a vertical storage rack lacks the capacity of, for example, a serpentine storage rack of similar height. Several of such prior art dispensing mechanisms agitate the contents of the can to an excessive degree when dispensing the same, an obvious drawback when dispensing carbonated products such as beer. Still others of such prior art dispensing mechanisms, while avoiding undue agitation, delay delivery of the dispensed can for a relatively long time after the user actuates the dispensing mechanism; ideally, the dispensing mechanism should deliver a can of beer to a bartender shortly after he actuates the dispensing mechanism. Finally, many of the prior art dispensing mechanisms are overly complicated and are expesive to construct and maintain.

Accordingly, it is an object of the present invention to provide a can dispensing apparatus which quickly and conveniently dispenses a canned product without substantial agitation of the contents thereof.

It is another object of the present invention to provide such a dispensing apparatus which is of relatively simple and inexpensive construction.

It is still another object of the present invention to provide such a dispensing apparatus wherein the component actuated by the user to dispense a canned product also serves to directly deliver the dispensed canned product directly into the hand of the user.

It is a further object of the present invention to provide such a dispensing apparatus which may be operated either manually or automatically with the aid of electromechanical means.

It is still a further object of the present invention to provide such a dispensing apparatus which may be used to link a walk-in cooler or other large refrigerated enclosure with a bar or other serving area.

These and other objects of the present invention will become more apparent to those skilled in the art as the description thereof proceeds.

SUMMARY OF THE INVENTION

Briefly described, and in accordance with one embodiment thereof, the present invention relates to an apparatus for selectively and individually dispensing cans from a supply of such cans, and includes a storage rack having a discharge end and including a lowermost storage shelf inclined downwardly toward the discharge end of the storage rack. The portion of the storage rack proximate the discharge end causes those cans proximate thereto to be serially aligned, one can behind another. One or more stops are secured to the discharge end of the storage rack, and the stops normally engage the first (or lowermost) can in the storage rack to prevent it and those cans behind it from freely falling from the discharge end of the storage rack. A dispensing lever cooperates with the discharge end of the storage rack and with the stops for individually dispensing a can from the storage rack.

The dispensing lever includes first and second ends, as well as a ramp portion extending from the first end to a point proximate the second end. The dispensing lever extends at a downward incline toward the first end thereof for delivering a dispensed can thereto. The second end of the dispensing lever includes a camming surface disposed generally behind the stops for engaging the underside of the first can and raising the first can above and over the stops. The second end of the dispensing lever also includes a catch disposed generally behind and below the camming surface for engaging the forwardmost portion of the second can (i.e., the can immediately behind the first can within the storage rack), thereby temporarily preventing advancement of the second can and those cans behind it toward the discharge end while the first can is being dispensed. The dispensing apparatus further includes a mechanism for supporting the dispensing lever to allow limited turning movement thereof about a lateral axis, whereupon the application of a downward force to the first end of the dispensing lever causes the dispensing lever to turn about the lateral axis from a rest position to a raised position for raising the second end of the dispensing lever. As the second end of the dispensing lever is raised, it in turn raises the first can over the stops and allows the first can to advance onto the ramp portion of the dispensing lever. Upon removing the downward force from the first end of the dispensing lever, the dispensing lever returns to its rest position, thereby allowing the second can to fully advance to the stops.

In the preferred embodiment of the present invention, the dispensing lever is supported by a fulcrum and a guiding linkage. The linkage includes upper and lower opposing ends, the upper end being pivotally secured to the discharge end of the storage rack at a first pivot point, and the lower end being pivotally secured to the dispensing lever at a second pivot point. The fulcrum engages the underside of the dispensing lever at a point disposed between the second pivot point and the first end of the dispensing lever. The lateral axis about which turning movement of the dispensing lever is effected coincides with the point of engagement between the fulcrum and the dispensing lever, the linkage serving to guide turning movement of the dispensing lever with respect to the discharge end of the storage rack. When the dispensing lever is in its rest position, the second end of the dispensing lever rests upon a support member secured to the discharge end of the storage rack.

The aforementioned linkage preferably includes a runway having an upper end disposed immediately above the stop and having a lower end disposed proximate the ramp portion of the dispensing lever. As the dispensing lever is raised, the camming surface, linkage runway, and dispensing lever ramp portion all become substantially coplanar, allowing the dispensed can to smoothly roll down the dispensing lever into the hand of a user.

In the preferred embodiment of the present invention, the above described dispensing apparatus is installed within a thermally insulated housing, such as a walk-in cooler or other refrigerated enclosure. Such an enclosure includes a front wall having an aperture through which a dispensed can may be delivered to a point external from the housing. The ramp portion of the dispensing lever may extend through the aperture for being actuated, i.e., being manually depressed downward by a user, and for subsequently delivering a dispensed can to the user. Alternatively, electromechanical means may be provided by selectively applying a downward force to the first end of the dispensing lever for dispensing a can from the storage rack. In either case, an air curtain, flap, or similar mechanism is provided for restricting the passage of air through the aperture within the front wall of the housing to maintain the temperature of the air therein at a desired temperature.

BRIEF DESCRIPTION OF THE DRAWINGS

FIG. 4 is a cross-sectional view of the dispensing apparatus shown in a rest position.

FIG. 5 is a cross-sectional view of the dispensing apparatus illustrating, in dashed lines, a raised position of the dispensing lever.

DETAILED DESCRIPTION OF THE PREFERRED EMBODIMENT

Figure 1:
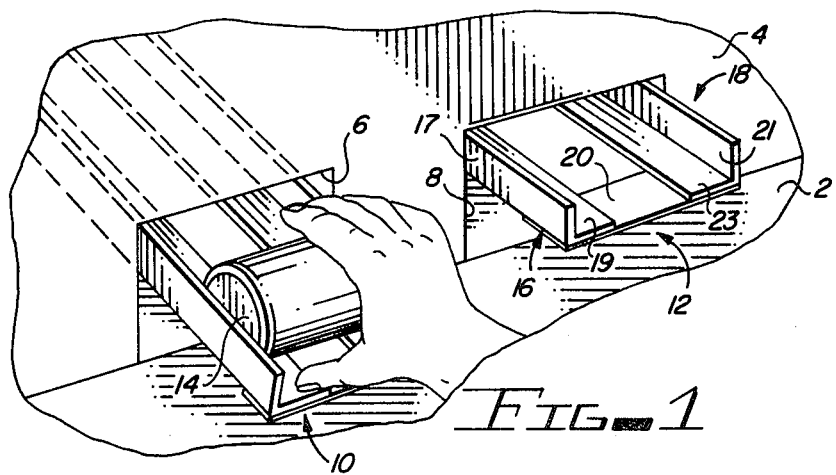
FIG. 1 is a partial perspective view illustrating the manner in which a bartender uses a manually actuated embodiment of the present invention to dispense a can of beer through an aperture leading to a walk-in cooler behind the bar area.

Shown in FIG. 1 is a portion of an area located behind a bar or other beverage service area, including a generally horizontal back bar counter 2 and a vertical rear bar wall 4. As illustrated in FIG. 1, apertures 6 and 8 are formed in rear wall 4 proximate counter 2 for allowing first and second beer can dispensing levers 10 and 12, respectively, to extend forwardly through rear wall 4 immediately above counter 2. As will be described in greater detail below, dispensing levers 10 and 12 may be used to dispense refrigerated cans of beer or other beverages, such as can 14, from a refrigerated enclosure located behind wall 4, which refrigerated enclosure may, for example, be a large walk-in cooler.

A first end of dispensing lever 12 is visible within FIG. 1 from which it may be seen that dispensing lever 12 includes a pair of L-shaped angle brackets 16 and 18 disposed to face one another. Angle bracket 16 includes a generally vertically extending flange 17 as well as an inwardly directed portion 19 extending perpendicular thereto. Similarly, angle bracket 18 includes a generally vertically extending flange 21 as well as an inwardly directed portion 23 extending perpendicular thereto. Braces such as those designated 20 and 20' (see FIG. 3A) are welded or otherwise attached to the undersides of portions 19 and 23 of angle brackets 16 and 18, respectively, to maintain flanges 17 and 21 spaced apart by a distance commensurate with the height (as measured when a can is stood upright) of the particular type of beer cans to be dispensed. Inwardly directed portions 19 and 23 of angle brackets 16 and 18, respectively, form a ramp down which a dispensed can of beer may be rolled into the hand of a user, and are accordingly inclined downwardly to cause a dispensed can to roll down dispensing lever 12.

Figure 2:
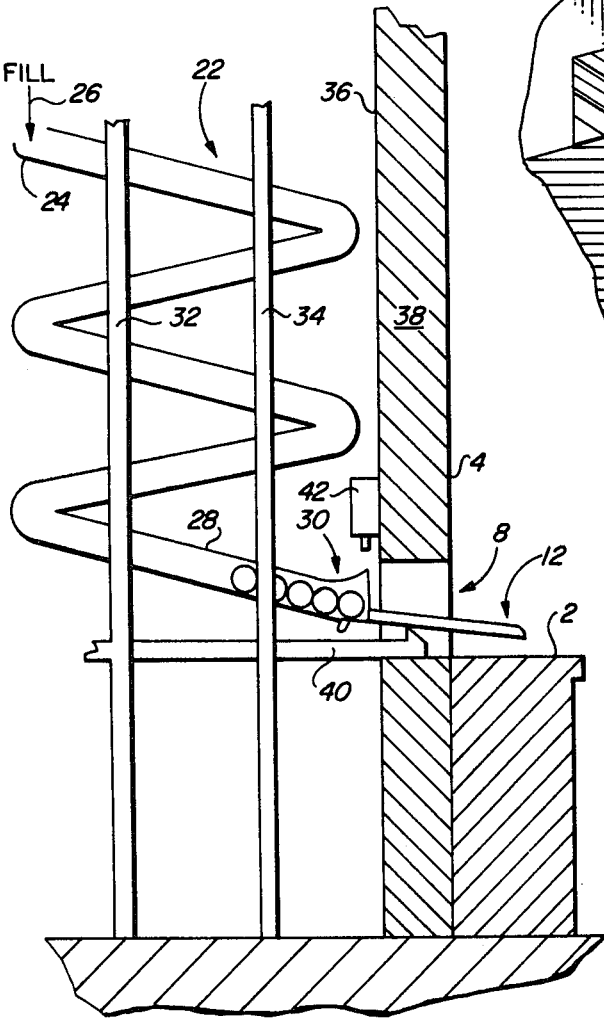
FIG. 2 is a cross-sectional view of the rear portion of a bar and a walk-in cooler behind the bar and illustrating the manner in which the present invention may be utilized to link the walk-in cooler with the back counter of the bar.

The storage rack with which dispensing lever 12 is associated is shown in FIG. 2 and is designated generally by reference numeral 22. As shown, storage rack 22 may be of a generally serpentine configuration for storing a relatively large quantity of cans for a given vertical height of the storage rack. Storage rack 22 includes an upper end 24 into which cans may be deposited for filling storage rack 22, as designated by arrow 26. When storage rack 22 is empty, cans inserted in upper end 24 roll downwardly through the various reaches of the serpentine storage rack until they ultimately stop within a lowermost storage shelf or conveyance 28 proximate discharge end 30 of the storage rack. Lowermost storage shelf 28 is disposed approximately at a twenty degree angle with respect to the horizontal in the preferred embodiment of the present invention; in any event, the angle between lowermost storage shelf 28 and the horizontal should be less than forty-five degrees to enhance the operation of the dispensing mechanism. The various reaches of serpentine storage rack 22 are supported by a plurality of vertically extending supports, such as those designated 32 and 34 within FIG. 2. Base member 40 is secured to supports 32 and 34 and extends partially into aperture 8 for supporting a fulcrum as will be described below.

Figure 3A:
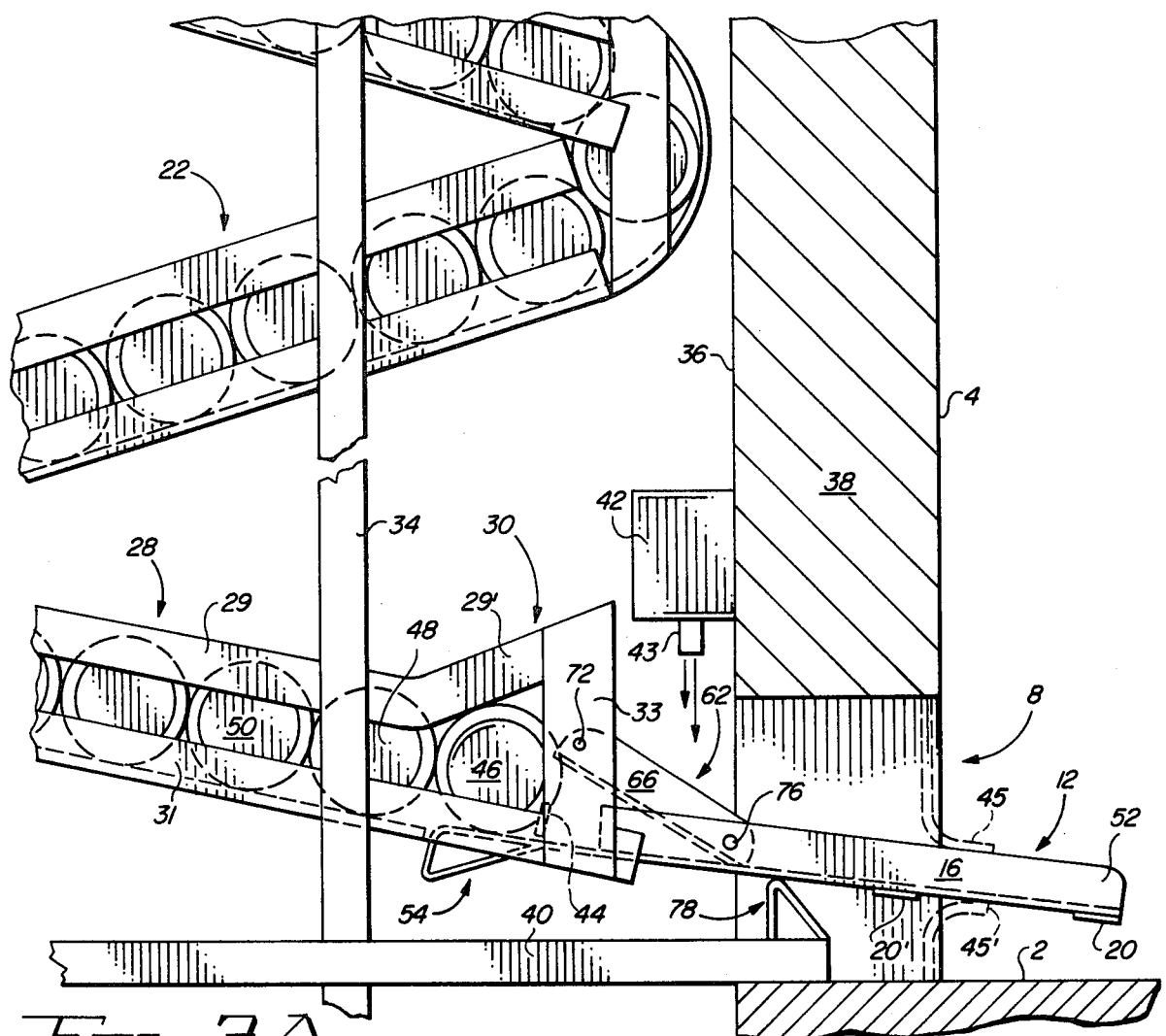
FIG. 3A is a side view of a dispensing apparatus constructed in accordance with the teachings of the present invention.

Still referring to FIG. 2, serpentine storage rack 22 is disposed within a refrigerated enclosure located immediately behind rear wall 4 of the bar. The refrigerated enclosure includes a thermally insulated front wall 38 including an interior surface 36. Also shown in FIG. 2 is a blower 42 secured to interior wall 36 above aperture 8. Referring briefly to FIG. 3A, blower 42 includes an outlet 43 for directing refrigerated air downwardly across aperture 8 to inhibit the inflow of warm air or the outflow of cool air therethrough. Such a blower arrangement may be known to those skilled in the art as an air curtain. Alternatively, or in addition to blower 42, resilient curtains 45 and 45' (see FIG. 3A) may be positioned above and below dispensing lever 12, respectively, within aperture 12 for impeding the passage of air through aperture 12 while permitting free movement of dispensing lever 12 and discharge of dispensed cans.

In the preferred embodiment of the present invention, the refrigerated enclosure within which storage rack 22 is installed is a large walk-in type cooler located immediately behind rear wall 4 of the bar. However, those skilled in the art will appreciate that the dispensing apparatus of the present invention may be used with both permanently installed and portable thermally insulated enclosures and may be used to dispense canned products which are intended to be served heated as well as those which are intended to be served cooled.

The lower portion of serpentine storage rack is shown in greater detail in FIG. 3A. Lowermost can storage shelf 28 includes an upper cover member 29 and a lower ramp member 31 extending parallel thereto. The side edges of upper member 29 extend downwardly, and the side edges of lower member 31 extend upwardly to form a track for conveying the plurality of cans, such as those designated 46, 48, and 50, toward discharge end 30. Upper member 29 and lower member 31 are each of a width commensurate with the height of the cans to be dispensed (i.e., when the cans are standing upright) and are spaced apart from one another by a distance commensurate with the diameter of such cans. Accordingly, the cans which advance toward discharge end 30 are necessarily serially aligned, one can behind another. While, in the preferred embodiment of the present invention, the cans are serially aligned throughout the entire length of serpentine storage rack 22, storage rack 22 may take other forms, provided that the cans proximate discharge end 33 are forced to be serially aligned. Immediately adjacent discharge end 30, upper member 29 includes an upwardly turned end portion 29' for allowing the lowermost can 46 to be raised upwardly. End portion 29' serves as a can deflector in a manner to be described in greater detail below. Side braces 33 and 35 see FIG. 4) are affixed at their upper and lower ends to end portion 29' of upper member 29 and lower member 31, respectively, and form opposing sides of discharge end 30. A pair of stops 44 are secured to the upwardly turned flanges of lower ramp member 31 proximate discharge end 30 to prevent the stored cans from freely folling out of discharge end 30.

With reference jointly to FIGS. 3A and 4, dispensing lever 12 includes a first end 52 and a second end 54 opposite thereto. That portion of dispensing lever 12 which extends generally in front of stops 44 forms a downwardly inclined ramp, the front portion of which is visible within FIG. 1, along which a dispensed can may be rolled into the waiting hand of a user. Second end 54 of dispensing lever 12 is disposed generally between and behind stops 44 and includes a camming surface 56 which is essentially planar and which extends rearwardly past stops 44 by a distance slightly less than the diameter of the cans to be dispensed. Second end 54 also includes a catch surface 58 which extends downwardly from the rear edge of camming surface 56 at approximately a right angle thereto, and catch surface 58 may also be essentially planar. A brace 60 extends between the lower edge of catch surface 58 and the front of camming surface 56. Camming surface 56, catch surface 58, and brace 60 are all preferably formed from a single piece of sheet metal formed into the described shape. The width of camming surface 56, catch surface 58, and brace 60 are each substantially less than the width of discharge end 30. Camming surface 56 is centered laterally within discharge end 30 for allowing second end 54 to be raised within discharge end 30 between the pair of stops 44 located on opposite sides thereof.

As mentioned above, dispensing lever 12 must be supported in a manner which allows the second end thereof to be raised for individually dispensing a can from discharge end 30. The mechanism for supporting discharge lever 12 includes a linkage 62 including a runway 64 and a pair of upwardly turned opposing side flanges 66 and 68. The upper end of runway 64 terminates at a point disposed above stops 44, while the lower end of runway 64 extends into the ramp portion of dispensing lever 12. Side flanges 66 and 68 are each secured at their upper ends at a first pivot point, as by pins 70 and 72. The lower ends of side flanges 66 and 68 lie adjacent the inner faces of vertical portions 17 and 21 of angle brackets 16 and 18, respectively, of dispensing lever 12 and are each pivotally secured thereto at a second pivot point, as by pins 74 and 76.

To further support dispensing lever 12, a fulcrum 78 is secured to base 40 and extends upwardly therefrom for engaging the underside of dispensing lever 12. The point of engagement between fulcrum 78 and dispensing lever 12 is preferably disposed between the second pivot point of linkage 62 (i.e., pins 74 and 76) and first end 52 of dispensing lever 12. In addition, fulcrum 78 is preferably positioned relative to dispensing lever 12 such that the weight of that portion of dispensing lever 12 located behind fulcrum 78 (i.e., toward second end 54) exceeds the weight of that portion of dispensing lever 12 disposed in front of fulcrum 78; as a result, second end 54 of dispensing lever 12 is normally biased downward under the force of gravity. In order to prevent second end 54 from falling substantially below discharge end 30, a generally horizontal support surface 80 extends across the lower extreme of discharge end 30 for supporting the second end of dispensing lever 12 at a rest position shown in FIG. 4 wherein camming surface 56 is substantially coplanar with the lower ramp member 31 of lowermost storage shelf 28.

As shown in FIG. 5, dispensing lever 12 may be turned about a lateral axis, coincident with the point of engagement between fulcrum 78 and the underside of dispensing lever 12 between a rest position designated by solid lines and a raised position designated by dashed lines and corresponding dashed lead lines. Linkage 62 serves to guide the turning movement of dispensing lever 12 between the rest position and raised position. As shown by FIG. 5, downward movement of first end 52 of dispensing lever 12 is converted by fulcrum 78 to upward movement of second end 54 and a corresponding upward swinging movement of linkage 62. When in the raised position, camming surface 56 is disposed slightly above the uppermost point of stops 44 and extends generally continuous and coplanar with runway 64; in turn, runway 64 extends generally coplanar with the ramp portion of dispensing lever 12. Thus, a relatively smooth continuous surface extends from camming surface 56 downwardly toward first end 52 of dispensing lever 12, thereby preventing substantial agitation of the contents of a dispensed can. Furthermore, when second end 54 is in the raised position, catch surface 58 extends above lower ramp member 31 of lowermost storage shelf 28 for engaging the frontmost portion of can 48 and preventing further advancement thereof toward stops 44 until dispensing lever 12 is returned to its rest position.

Figure 3B:
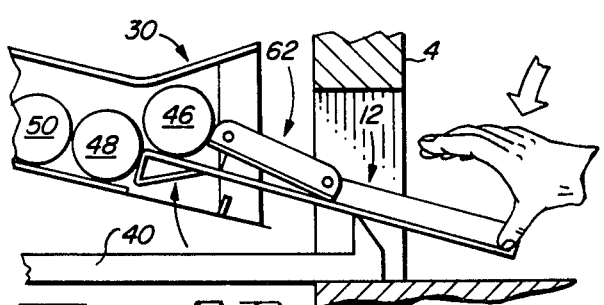
FIGS. 3B–3E sequentially illustrate the operation of the dispensing apparatus shown in FIG. 3A.
Figure 3C:
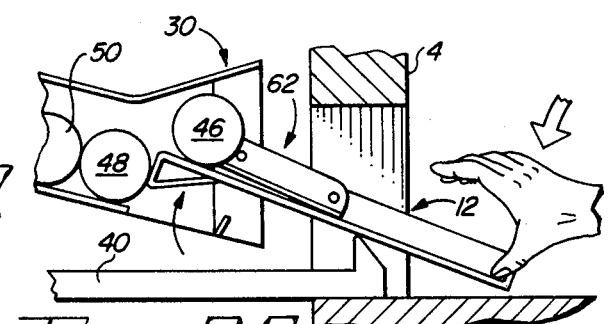
Figure 3D:
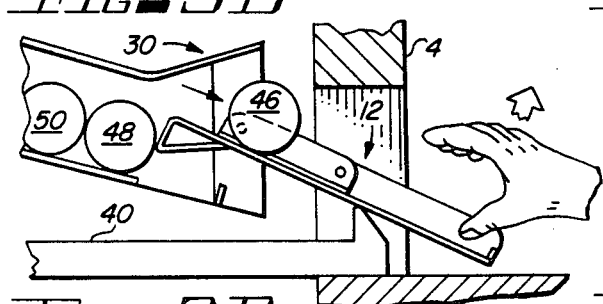
Figure 3E:
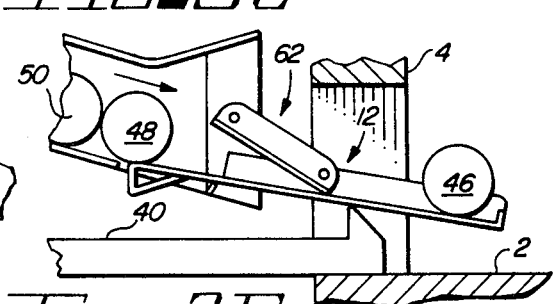

The actual operation of the dispensing apparatus is best explained with reference to FIGS. 3A-3E. In FIG. 3A, dispensing lever 12 is shown in its initial rest position wherein a first or lowermost can 46 has its forwardmost portion engaged with stops 44 and its lowermost portion engaged with camming surface 56 of second end 54. When a user wishes to dispense can 46 from discharge end 30, he pushes down upon first end 52 of dispensing lever 12 with him thumb, as shown in FIG. 3B. Dispensing lever 12 is then caused to turn about fulcrum 78 to raise can 46 upwardly. As second end 54 of dispensing lever 12 is raised, catch surface 58 is also raised into position for engaging the second or next lowermost can 48. As shown in FIG. 3C, the user continues to apply downward force with his thumb to first end 52 of dispensing lever 12 until dispensing lever 12 has been fully turned to its raised position. At this point, can 46 may freely roll off of camming surface 56 and onto runway 64 of linkage 62, as indicated by FIG. 3D. Preferably, the user applies only so much force to dispensing lever 12 as is needed to elevate can 46 to the upper end of runway 64. When the user exerts excessive force, end portion 29' of discharge end 30 functions as a deflector to deflect cans that are raised upwardly off of camming surface 56 back toward runway 64 and the ramp portion of dispensing lever 12. Upon elevating can 46 onto runway 64, the user may remove his thumb from first end 56 of dispensing lever 12 for allowing dispensing lever 12 to return to its rest position. Can 46 continues to roll down runway 64 and onto the ramp portion of dispensing lever 12. Upon rolling to first end 52 of dispensing lever 12, can 46 may be easily caught within the extended fingers and thumb of the user. With relatively little practice, a user can learn to depress dispensing lever 12 and catch the dispensed can in one continuous motion. As shown in FIG. 3E, dispensing lever 12 returns to its rest position immediately after the user removes his thumb from first end 52 thereof; upon catch surface 58 falling below lower ramp member 31 of lowermost storage shelf 28, can 48 rolls over camming surface 56 until it engages stops 44, and the above-described dispensing cycle may then be immediately repeated.

In an alternate embodiment of the present invention, linkage 62 is eliminated, and fulcrum 78 is replaced by an axle for rotatably supporting dispensing lever 12 about a lateral axis. However, the use of linkage 62 and fulcrum 78 is preferred for at least three reasons. First, the use of linkage 62 has been found to cause dispensing lever 12 to move slightly rearward when dispensing lever 12 is turned to its raised position, i.e., the point of engagement between fulcrum 78 and the underside of dispensing lever 12 actually shifts to a point closer to first end 52 when dispensing lever 12 is turned to its raised position. This effect tends to be increased when the first pivot point, represented by pins 70 and 72, is located close to the lower edges of flanges 68 and 66 of linkage 62, and when the second pivot point, represented by pins 74 and 76, is located close to the upper edges of vertical flanges 17 and 21 of dispensing lever 12 and flanges 66 and 68 of linkage 62, as shown more clearly in FIGS. 4 and 5. This rearward movement of dispensing lever 12 is not opposed by the weight of can 48 and those cans behind it as such rearward movement largely occurs before can 48 becomes disengaged from can 46 and engaged with catch 58. When can 46 is raised sufficiently to become disengaged with can 48, the weight of can 48 and those cans behind it bears upon catch surface 58, tending to push it forwardly. The force applied to catch surface 58 in the forward direction tends to slide dispensing lever 12 forwardly and thereby aids in returning dispensing lever 12 to its rest position without the need for biasing springs or other additional mechanisms. Secondly, the use of linkage 62 and fulcrum 78 tends to allow dispensing lever 12 to operate more smoothly. Third, should a dispensed can temporarily remain at rest upon runway 64 when dispensing lever 12 is in its raised position, the can is more likely to become dislodged and begin rolling down runway 64 after dispensing lever 12 is released, since the downward incline of runway 4 is thereby increased.

Figure 6:
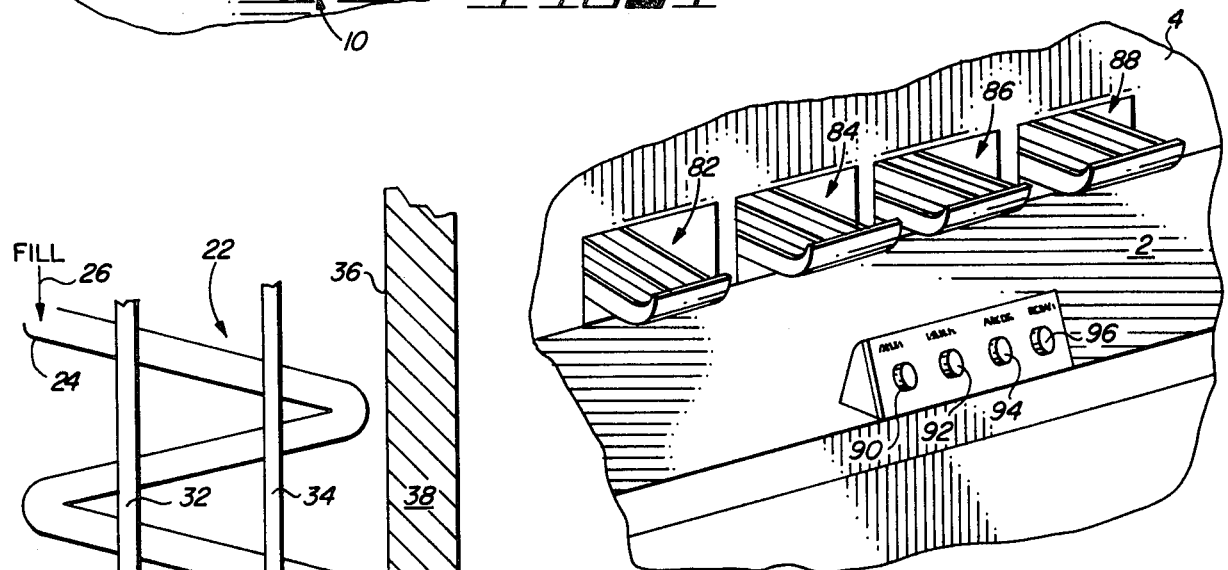
FIG. 6 is a partial perspective view of the back counter of a bar equipped with a plurality of can dispensers actuated by push button electrical switches rather than by direct manual control.
Figure 7:
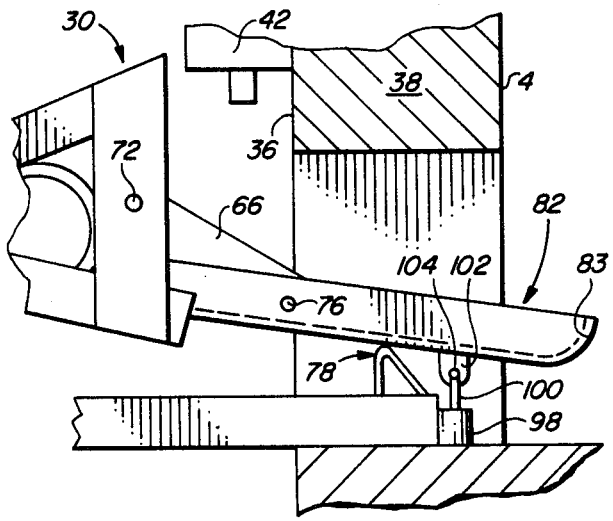
FIG. 7 is a side view of a dispensing apparatus including an electrically actuated solenoid for operating the dispensing lever upon depression of an associated push button electrical switch.

While the previously described embodiment of the present invention is adapted to be manually operated, the dispensing apparatus is also adaptable to automatic control. As shown in FIG. 6, a bank of four automatic dispensers 82, 84, 86 and 88 may be controlled by four corresponding push button electrical switches 90, 92, 94 and 96 positioned near the front of counter 2. Each dispenser may be formed to include an upwardly turned lip, such as lip 83 shown in conjunction with dispenser 82, for retaining a dispensed can for subsequent removal by the user. FIG. 7 illustrates a dispensing apparatus of the general type previously described but modified to automatically actuate the dispensing lever under the control of such push button electrical switches. As shown in FIG. 7, a solenoid 98 is positioned in front of fulcrum 78 for selectively pulling down upon an associated plunger shaft 100 when the solenoid is electrically energized. An eyelet extends downwardly from the underside of dispensing lever 82, and the upper end of plunger shaft 100 is coupled to eyelet 102 by pin 104. When a user operates push botton 90 (see FIG. 6), an electrical current is caused to flow within solenoid 98 for drawing plunger shaft 100 therein. In this manner, operation of push button 90 selectively causes a downward force to be applied to the front end of dispensing lever 82 for dispensing a can in the general manner previously described.

Those skilled in the art will now appreciate that an improved can dispensing apparatus has been described which is of relatively simple and inexpensive construction and which quickly and conveniently dispenses a can without unduly agitating the contents thereof. The dispensing lever serves the dual purpose of dispensing a can from the storage rack and delivering the dispensed can directly into the hand of the user. The described dispensing apparatus is ideally suited for dispensing refrigerated cans of beer or other beverages from a walk-in cooler to a bar service area and may also be installed within smaller capacity refrigerated enclosures, including those which are portable. While the invention has been described with reference to two preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. An apparatus for selectively dispensing cylindrical cans individually from a supply of such cans, comprising in combination:
    a. storage means for storing a plurality of cans, said storage means having a discharge end and including a lowermost storage conveyance inclined downwardly toward said discharge end for conveying said plurality of stored cans thereto, said storage means causing those of said plurality of stored cans proximate said discharge end to be serially aligned, said serially aligned cans proximate said discharge end including, at any particular time, a first can closest to said discharge end and a second can disposed immediately behind said first can;
    b. a stop secured to said discharge end for engaging said first can to prevent said serially aligned cans proximate said discharge end from freely falling therefrom;
    c. a dispensing lever having first and second ends and including a ramp portion therebetween inclined downwardly toward the first end of said dispensing lever for delivering a dispensed can thereto, the second end of said dispensing lever including a camming surface disposed generally behind said stop for engaging said first can and raising said first can above and over said stop when the second end of said dispensing lever is raised, the second end of said dispensing lever further including a catch disposed generally behind and below said camming surface for engaging said second can when the second end of said dispensing lever is raised; and
    d. support means for supporting said dispensing lever to allow said dispensing lever to be turned relative to the first and second ends thereof about a lateral axis whereupon the application of a downward force to the first end of said dispensing lever causes said dispensing lever to turn about said lateral axis from a rest position to a raised position for raising the second end of said dispensing lever, in turn raising said first can over said stop and allowing said first can to advance onto said ramp portion of said dispensing lever while preventing substantial advancement of said second can toward said discharge end through engagement of said catch with said second can, and whereupon the removal of said downward force allows said dispensing lever to return from the raised position toward the rest position, thereby terminating the engagement between said catch and the second can and allowing said second can to advance toward said stop, said support means including:
        i. linkage means having an upper end pivotally secured to said discharge end at a first pivot point and having an opposing lower end pivotally secured to said dispensing lever at a second pivot point;
        ii. a support means secured to said discharge end for supporting the second end of said dispensing lever when said dispensing lever is at said rest position;
        iii. a fulcrum for engaging the underside of said dispensing lever between said second pivot point and the first end of said dispensing lever, said lateral axis about which said dispensing lever turns being coincident with the point of engagement between said fulcrum and the underside of said dispensing lever; and
        iv. the application of a downward force to the first end of said dispensing lever turning said dispensing lever about said fulcrum to raise the second end of said dispensing lever off of said support member, and said linkage means guiding turning movement of said dispensing lever between said rest position and said raised position.

2. An apparatus as recited by claim 1 wherein said dispensing lever extends along a longitudinal axis from its first end to its second end, and wherein said linkage means causes said dispensing lever to slide along its longitudinal axis toward the second end thereof, relative to the point of engagement between said fulcrum and the underside of said dispensing lever, when said dispensing lever is turned from its rest position to its raised position.

3. An apparatus as recited in claim 1 wherein said discharge end includes a deflector overlying said stop for deflecting cans which are raised upwardly off of said camming surface downwardly toward said ramp portion of said dispensing lever.

4. An apparatus as recited in claim 1 wherein said ramp portion of said dispensing lever includes a ramp inclined downwardly toward the first end of said dispensing lever, said ramp having a width commensurate with the height of the cylindrical cans being dispensed, said ramp portion further including a pair of upwardly turned flanges extending from opposing side edges of said ramp.

5. An apparatus as recited by claim 4 wherein said linkage means includes a runway inclined downwardly from an upper end to a lower end thereof, said linkage means also including a pair of upwardly turned flanges extending from opposing side edges of said runway, said runway having a width commensurate with the height of the cylindrical cans being dispensed, said upwardly turned flanges of said linkage means being pivotally secured at said first pivot point to opposing sides of said discharge end proximate the upper end of said linkage means, said upwardly turned flanges of said linkage means lying within and adjacent said upwardly turned flanges of said ramp portion of said dispensing lever proximate the lower end of said linkage means and being pivotally secured thereto at said second pivot point, the upper end of said runway being disposed above said stop, said runway receiving cans raised by said camming surface and conveying cans received thereby to said ramp portion of said dispensing lever.

6. An apparatus as recited by claim 5 wherein the angle at which said runway is inclined downwardly increases when said dispensing lever returns from its raised position to its rest position.

7. An apparatus as recited by claim 5 wherein said ramp of said dispensing lever and said runway of said linkage means are substantially coplanar when said dispensing lever is in its raised position.

8. An apparatus as recited by claim 5 wherein said camming surface is substantially continuous with said runway when said dispensing lever is in its raised position.

9. An apparatus as recited by claim 1 wherein said camming surface extends behind said stop by slightly less than the diameter of the plurality of cans to be dispensed.

10. An apparatus as recited by claim 1 wherein the portion of said dispensing lever extending from the second end thereof to said point of engagement weighs more than the portion of said dispensing lever extending from the first end thereof to said point of engagement.

11. An apparatus as recited by claim 1 wherein said lowermost storage conveyance is inclined downwardly by an angle which is less than forty-five degrees with respect to the horizontal.

* * * * *